United States Patent
Nakajima et al.

(10) Patent No.: US 9,796,847 B2
(45) Date of Patent: Oct. 24, 2017

(54) METHOD FOR PRODUCING THERMOPLASTIC RESIN COMPOSITION

(71) Applicant: Konica Minolta, Inc., Tokyo (JP)

(72) Inventors: Yo Nakajima, Hachioji (JP); Masashi Mamino, Mitaka (JP); Yiqiang Yu, Hachioji (JP); Ryuji Kitani, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/715,006

(22) Filed: May 18, 2015

(65) Prior Publication Data
US 2015/0337131 A1   Nov. 26, 2015

(30) Foreign Application Priority Data

May 20, 2014   (JP) .................. 2014-104694

(51) Int. Cl.

| | |
|---|---|
| *C08L 67/00* | (2006.01) |
| *C08L 69/00* | (2006.01) |
| *B29B 7/00* | (2006.01) |
| *B29B 7/88* | (2006.01) |
| *C08L 67/02* | (2006.01) |
| *B29C 47/92* | (2006.01) |
| *B29C 47/40* | (2006.01) |
| *B29C 47/64* | (2006.01) |
| *C08J 3/00* | (2006.01) |
| *C08J 3/20* | (2006.01) |
| *B29K 69/00* | (2006.01) |
| *B29K 67/00* | (2006.01) |
| *B29K 105/00* | (2006.01) |

(52) U.S. Cl.
CPC .............. *C08L 69/00* (2013.01); *B29B 7/007* (2013.01); *B29B 7/88* (2013.01); *B29C 47/40* (2013.01); *B29C 47/408* (2013.01); *B29C 47/64* (2013.01); *B29C 47/92* (2013.01); *C08J 3/005* (2013.01); *C08J 3/203* (2013.01); *C08L 67/02* (2013.01); *B29C 2947/92704* (2013.01); *B29K 2067/003* (2013.01); *B29K 2069/00* (2013.01); *B29K 2105/0026* (2013.01); *B29K 2105/0088* (2013.01); *B29K 2995/0088* (2013.01); *C08J 2367/02* (2013.01); *C08J 2369/00* (2013.01)

(58) Field of Classification Search
CPC .................. C08L 67/00; C08L 69/02

USPC .................................. 524/537, 539
See application file for complete search history.

(56) References Cited

U.S. PATENT DOCUMENTS

| | | | |
|---|---|---|---|
| 5,695,710 A | 12/1997 | Chen, Sr. et al. | |
| 6,174,943 B1* | 1/2001 | Matsumoto ............ | C08K 5/523 524/107 |
| 2004/0249072 A1 | 12/2004 | Warth et al. | |
| 2014/0155549 A1* | 6/2014 | Swinnen .............. | C08L 67/02 525/101 |

FOREIGN PATENT DOCUMENTS

| | | |
|---|---|---|
| CN | 1409743 A | 4/2003 |
| JP | 09124785 A | 5/1997 |
| JP | 2001-055497 A | 2/2001 |
| JP | 2001-207067 A | 7/2001 |
| JP | 2012136558 A | 7/2012 |

OTHER PUBLICATIONS

JP 2001-207067 machine translation, date of original document 2001.*
JP 2001-055497 machine translation date of original document 2001.*
Office Action dated Jul. 4, 2016 from the corresponding Chinese Application; Application No. 201510255676.X; Applicant: Konica Minolta, Inc.; Title of Invention: Method for Producing Thermoplastic Resin Composition; Total of 15 pages.
Notification of Reasons for Refusal dated Nov. 22, 2016 from corresponding Japanese Application No. 2014-104694; English translation of Notification of Reasons for Refusal; Total of 8 pages.

* cited by examiner

*Primary Examiner* — Edward Cain
(74) *Attorney, Agent, or Firm* — Lucas & Mercanti, LLP

(57) ABSTRACT

Provided is a thermoplastic resin composition having high flame resistance, high fluidity during injection molding, and improved impact resistance in a molded article. To provide a method for producing a thermoplastic resin composition, the method including a step (1) of obtaining a polyester resin mixture by melt-kneading a crystalline terephthalate-based polyester resin, and a polyester resin A including at least one kind selected from the group consisting of isophthalic acid, orthophthalic acid, naphthalenedicarboxylic acid, anthracene dicarboxylic acid and pyridine dicarboxylic acid as an aromatic dicarboxylic acid component with an extruder, and a step (2) of mixing the polyester resin mixture, a polycarbonate resin, a flame retardant and a toughening agent.

9 Claims, No Drawings

METHOD FOR PRODUCING THERMOPLASTIC RESIN COMPOSITION

CROSS-REFERENCE TO RELATED APPLICATION

This application is based on Japanese Patent Application No. 2014-104694 filed on May 20, 2014, the contents of which are incorporated herein by reference.

BACKGROUND

1. Technical Field

The present invention is a method for producing a thermoplastic resin composition.

2. Description of Related Art

Thermoplastic resins such as polycarbonate resins and polyester resins, and resin compositions thereof have been presently used in a wide range of fields as molding materials for containers, wrapping films, home appliances, office automation equipment, audiovisual equipment, electrical and electronics parts and automobile parts and the like in terms of excellent molding processability, mechanical properties, heat resistance, weather resistance, appearances, hygienic properties, economical efficiency and the like.

The resin molded articles used for these purposes are required to have flame resistance. In order to impart flame resistance to thermoplastic resins, it is generally known that a flame retardant is added to the resins (see e.g. Japanese Patent Application Laid-Open No. 2012-136558).

In recent years, laws such as "The Low for Promotion of Sorted Collection and Recycling of Containers and Packaging (The Containers and Packaging Recycling Law)" and "Law Concerning the Promotion of Procurement of Eco-Friendly Goods and Services by the State and Other Entities (Law on Promoting Green Purchasing)" have been executed in succession, and thus there is an increasing interest in such thermoplastic resins and a material recycle technology for the molded products of resin compositions thereof. In particular, it is urgent to establish a material recycle technology for polyethylene terephthalate (hereinafter, also referred to as "PET") bottles using PET resin, the usage of which has been rapidly increased, as a material. In addition, with the growth of optical recording medium products (optical disks) using a polycarbonate (hereinafter, also referred to as "PC") resin as a material such as CD, CD-R, DVD and MD, a method for reusing mill ends discharged during the molding process thereof, and a method for reusing a polycarbonate resin obtained after a reflection layer and a recording layer and the like are exfoliated from an optical disk, which becomes waste, have been examined.

When resins obtained by pulverizing molded products of crystalline terephthalate-based polyester typified by PET resin such as used PET bottles retrieved from the market or PC resins such as optical disks are molded again, in particular when the resins are molded again by an injection molding method, high fluidity during molding is required as the characteristics of resins in order that the resins can be applied to various molded bodies.

Further, when in a resin composition, a polyester resin and a polycarbonate resin are used for as component members for home appliances, office automation equipment and the like, high impact strength is required.

SUMMARY

In a system in which a crystalline terephthalate-based polyester resin such as PET and a polycarbonate resin are melt-mixed, however, it has been difficult to obtain both fluidity during molding and the impact resistant characteristics of a molded article.

The present invention is made in view of the above circumstances, and an object thereof is to provide;

1. a method for producing a thermoplastic resin composition including a crystalline terephthalate-based polyester resin and a polycarbonate resin, wherein the resin composition has high flame resistance as well as high fluidity during injection molding, and further high impact strength in a molded article.

To achieve at least one of the abovementioned objects, the production method reflecting one aspect of the present invention includes;

1. A method for producing a thermoplastic resin composition, including a step (1) of obtaining a polyester resin mixture by melt-kneading a crystalline terephthalate-based polyester resin, and a polyester resin A including at least one kind selected from the group consisting of isophthalic acid, orthophthalic acid, naphthalenedicarboxylic acid, anthracene dicarboxylic acid and pyridine dicarboxylic acid as an aromatic dicarboxylic acid component with an extruder; and a step (2) of mixing the polyester resin mixture, a polycarbonate resin, a flame retardant and a toughening agent.

2. The production method described in production method 1., wherein polyester resin A is a naphthalate-based polyester resin.

3. The production method described in production method 1. or 2., wherein the crystalline terephthalate-based polyester resin be 50 to 80 parts by weight, and the polyester resin A be 20 to 50 parts by weight (wherein the sum of the terephthalate-based polyester resin and the polyester resin A is 100 parts by weight).

4. The production method described in any one of production method 1. to 3., wherein the cylinder temperature of an extruder be 250 to 280° C.

5. The production method described in any one of production method 1. to 4., wherein the melting calorie ($\Delta H_A$) in the DSC melting curve of the polyester resin mixture be 70% or less with respect to the melting calorie ($\Delta H_B$) in the DSC melting curve of the crystalline terephthalate-based polyester resin ($\Delta H_A / \Delta H_B \leq 0.7$).

6. The production method described in any one of production method 1. to 5., wherein the crystalline terephthalate-based polyester resin be at least one kind of polyethylene terephthalate and polybutylene terephthalate, and the polyester resin A be at least one kind of polyethylene naphthalate and polybutylene naphthalate.

7. The production method described in any one of production method 1. to 6., wherein a metal-based catalyst be added in an amount of 0.05 weight % or less with respect to a total of 100 weight % of the crystalline terephthalate-based polyester resin and the polyester resin A.

8. The production method described in any one of production method 1. to 7., wherein in the step (2), mixed are 10 to 90 parts by weight of the polyester resin mixture, 10 to 90 parts by weight of the polycarbonate resin (wherein the sum of the polyester resin composition and the polycarbonate resin is 100 parts by weight), 0.5 to 20 parts by weight of the compatibilizing agent, 1 to 40 parts by weight of the flame retardant, 0.1 to 1 part by weight of the drip inhibitor, and 1 to 20 parts by weight of the toughening agent.

9. The production method described in any one of production method 1. to 8., wherein the molecular weight (Mw) of the polycarbonate resin be 20,000 to 70,000.

The objects, features, and characteristics of this invention other than those set forth above will become apparent from the description given herein below with reference to preferred embodiments.

DETAILED DESCRIPTION

One embodiment of the present invention is a method for producing a thermoplastic resin composition, the method including a step (1) of melt-kneading a crystalline terephthalate-based polyester resin, and a polyester resin A including at least one kind selected from the group consisting of isophthalic acid, orthophthalic acid, naphthalenedicarboxylic acid, anthracene dicarboxylic acid and pyridine dicarboxylic acid as an aromatic dicarboxylic acid component using an extruder to obtain a polyester resin mixture, and a step (2) of mixing the above-mentioned polyester resin mixture, a polycarbonate resin, a flame retardant and a toughening agent.

According to the above-mentioned embodiment, the crystalline terephthalate-based polyester resin and the polyester resin A that has similar structure to that of a terephthalate-based polyester resin are preliminarily melt-kneaded, whereby to obtain a resin composition that satisfies both of high flame resistance and high fluidity. In addition, by preliminarily melt-kneading the crystalline polyester and the polyester resin A, it is possible to improve impact resistance of a molded article of the resin composition.

Hereinafter, embodiments of the present invention will be described.

The first embodiment is characterized that the crystalline terephthalate-based polyester resin (hereinafter, also referred to as the terephthalate-based polyester) and the polyester resin A are preliminarily melt-kneaded, and then other components such as a flame retardant are added.

As described above, when the terephthalate-based polyester such as PET is molded again by recycling, it has been difficult to achieve both flow characteristic during molding and impact resistance (toughness) of a molded article.

The present inventors presumed that the cause for decrease of fluidity when a terephthalate-based polyester is used, is that crystallization of the terephthalate-based polyester has bad influence on the fluidity or the impact resistance.

As a result of keen examination, it is found that by preliminarily melt-kneading (primary kneading) the terephthalate-based polyester and the polyester resin A and then melt-mixing other components, it is possible to achieve both of the fluidity and the impact resistance.

Detailed mechanism for the thermoplastic resin composition obtained by the production method of the first embodiment to improve both of the fluidity and the impact resistance is not clear, but presumed as follows. Furthermore, the following mechanism does not limit the present invention.

By preliminary melt-kneading the terephthalate-based polyester and the polyester resin A, the molecular chains of the terephthalate-based polyester and the polyester resin A are cut, and transesterification occurs in which molecular chains are exchanged with each other. By this transesterification, the terephthalate-based polyester-derived segments and the polyester resin A-derived segments are randomly arranged in the molecules, whereby to copolymerize the resins. This is considered to suppress crystallization of the resins. It is presumed that this transesterification occurs from the facts that the terephthalate-based polyester resin has terephthalic acid as an aromatic dicarboxylic acid component, and the polyester resin A includes isophthalic acid, orthophthalic acid, naphthalenedicarboxylic acid, anthracene dicarboxylic acid or pyridine dicarboxylic acid, which is close to the structure of terephthalic acid, as an aromatic dicarboxylic acid component.

In a system in which a crystalline terephthalate-based polyester resin is mixed with an amorphous polycarbonate resin, the interaction at the interface of the crystal phase-amorphous phase is weak, and thus crack is easily generated, and with growth of the crack, toughness decreases easily. On the other hand, according to the production method of the present embodiment, it is considered that crystallization degree of the crystalline terephthalate-based polyester resin decreases, and thus generation of the crack is suppressed, and toughness of the thermoplastic resin composition improves. In addition, it is considered that each molecular chain cannot flow in the crystal, and movement of the melting molecular chain is impeded, and thus the fluidity is low in comparison to the amorphous state, but according to the production method of the present embodiment, crystallization degree of the crystalline terephthalate-based polyester resin decreases, and thus the fluidity of the thermoplastic resin composition also improves.

Even if the terephthalate-based polyester and the polyester resin A are melt-mixed with other addition components in a batch (without performing primary kneading), both of fluidity and impact resistance of the resin cannot be improved (see Comparative Example 1 described below). It is considered that this is due to the facts that even if the polycarbonate resin and the like are added in a batch, and melt-mixed, the chance of the reaction of the terephthalate-based polyester and the polyester resin A decreases, and transesterification is not effectively performed.

Furthermore, by the constitutions of the present embodiment, both of impact resistance and high fluidity mentioned above as well as high flame resistance are maintained.

Therefore, the thermoplastic resin composition obtained by the production method in this embodiment can be used as apart for various purposes such as office equipment, information-telecommunications equipment, electrical and electric equipment and consumer electronics which have complicated structures. In addition, even when recycled resins such as polyester resins and polycarbonate resins, which are obtained from retrieved molded products and mill ends during molding process and the like, are used, a resin composition with excellent flame resistance and excellent mechanical strength such as the modulus of elasticity, flexural strength and shock resistant strength and a molded body can be obtained.

Each step will be now described.

(Step (1))

In the step (1), a crystalline terephthalate-based polyester resin, and a polyester resin A including at least one kind selected from the group consisting of isophthalic acid, orthophthalic acid, naphthalenedicarboxylic acid, anthracene dicarboxylic acid and pyridine dicarboxylic acid as an aromatic dicarboxylic acid component are melt-kneaded using an extruder to obtain a polyester resin mixture. In the melt-kneading, it is preferred that only the crystalline terephthalate-based polyester resin and the polyester resin A be used as the resins.

Before the melt-kneading treatment, the preliminary mixing treatment which preliminarily mixes a terephthalate-based polyester and a crystalline polyester resin A can be performed. The mixers used for preliminary mixing include mixers such as a V type mixer, a ribbon mixer, a Nauta mixer and a Super mixer. In addition, it is preferred that the mixture be sufficiently dried before the melt-kneading treatment after the preliminary mixing treatment from the viewpoint that the hydrolysis reaction of a thermoplastic polyester resin is inhibited. The drying temperature at this time is not particularly limited and is preferably 70 to 100° C. In addition, the drying time is not particularly limited, and is preferably 2 to 6 hours. Further, because drying more easily progresses, drying under reduced pressure is preferred.

The melt-kneading is performed using an extruder. For the melt-kneading, a multiaxial kneading-extruder is preferably used, and a biaxial kneading-extruder is more preferably used because high shearing property can be imparted, and the transesterification proceeds easily. Furthermore, the melt-kneading means kneading is performed at a temperature where the terephthalate-based polyester and the polyester resin A are melted or higher temperature.

The cylinder temperature of the extruder in the melt-kneading is preferably 250 to 280° C. With 250 to 280° C. of the cylinder temperature, the transesterification reaction between the terephthalate-based polyester and the polyester resin A sufficiently occurs, and the fear of decomposition of the polyester resin is small, and the toughness can be maintained. The cylinder temperature of the extruder in the melt-kneading is more preferably 260 to 280° C. The mixing pressure is not particularly limited, but is preferably 1 to 20 MPa.

The cylinder temperature of an extruder herein indicates, when several temperatures are set in the cylinder of the extruder, the highest temperature in the cylinder part.

The discharge amount from an extruder during melt-kneading is not particularly limited, and is preferably from 10 to 100 kg/h and more preferably from 20 to 70 kg/h because melt-kneading is sufficiently performed and transesterification easily progresses.

The heat radiation calorie ($\Delta H_A$) in the DSC melting curve of the polyester resin mixture obtained in the step (1) is preferably 70% or less with respect to the heat radiation calorie ($\Delta H_B$) in the DSC melting curve of the terephthalate-based polyester ($\Delta H_A/\Delta H_B \leq 0.7$). $\Delta H_A/\Delta H_B$ is an indication representing the degree of the transesterification, and with $\Delta H_A/\Delta H_B \leq 0.7$, crystallinity of the polyester resin mixture further decreases, and the fluidity further improves. $\Delta H_A/\Delta H_B$ is more preferably 0.5 or less. The lower limit of $\Delta H_A/\Delta H_B$ is not particularly limited, but usually 0 or more.

In the present description, a DSC melting curve is a curve obtained by making the DSC measurement using DSC6220 (model number) manufactured by Seiko Instruments Inc. under the temperature program in which a sample is maintained at 30° C. for 3 minutes, then heated at a temperature increasing rate of 5° C./min to 280° C., and maintained at 280° C. for 5 minutes, followed by deleting the heat history, and then cooled at a temperature decreasing rate of 20° C./min to 30° C. The $\Delta H$ is a PEAK area obtained from 220° C. to 100° C. in the temperature decreasing process.

In the step (1), the mixing ratio by weight of the terephthalate-based polyester and the polyester resin A is not particularly limited. It is preferable that 50 to 80 parts by weight of the terephthalate-based polyester and 20 to 50 parts by weight of the polyester resin A be melt-kneaded with respect to a total of 100 parts by weight of the terephthalate-based polyester and the polyester resin A. With 50 parts by weight or less of the polyester resin A with respect to a total of 100 parts by weight of the terephthalate-based polyester and the polyester resin A, delay of the transesterification from steric hindrance is small, and flame resistance of the resin composition can be maintained. In addition, with 20 parts by weight or more of the polyester resin A with respect to a total of 100 parts by weight of the terephthalate-based polyester and the polyester resin A, crystallization of the terephthalate-based polyester can be suppressed. Because the toughness and the fluidity further improve, 50 to 70 parts by weight of the terephthalate-based polyester and 30 to 50 parts by weight of the polyester resin A with respect to a total of 100 parts by weight of the terephthalate-based polyester and the polyester resin A are preferably melt-kneaded.

The polyester resin kneaded mixture in the molten state obtained by melt-kneading as mentioned above is preferably subjected to cooling treatment after injected. The cooling treatment is not particularly limited, and, for example, a water cooling method in which the above-mentioned polyester resin kneaded mixture is immersed in 0 to 60° C. water, a cooling method using −40 to 60° C. gas, and a method in which the kneaded mixture is brought into contact with −40 to 60° C. metal, and the like can be used.

In addition, it is preferred that the mixture be sufficiently dried before the step (2) described below for the viewpoint that the hydrolysis reaction of a thermoplastic polyester resin is inhibited. The drying temperature at this time is not particularly limited and is preferably from 70 to 100° C.

In addition, the drying time is not particularly limited and is preferably from 2 to 6 hours. Further, because drying more easily progresses, drying under reduced pressure is preferred.

(Crystalline Terephthalate-Based Polyester Resin/Polyester Resin A)

The crystalline terephthalate-based polyester resin/polyester resin A are not particularly limited, and are preferably aromatic polyester with a structure in which an aromatic dicarboxylic acid or an ester derivative component thereof and a diol component such as an aliphatic diol or an alicyclic diol are linked by an ester reaction. As the polyester resins, for example, those obtained by polycondensation of an aromatic dicarboxylic acid or an ester derivative component thereof and an aliphatic diol or an alicyclic diol or the like by a well-known method can be used.

Examples of aromatic dicarboxylic acids include, but particularly not limited thereto, terephthalic acid, isophthalic acid, orthophthalic acid, 1,5-naphthalenedicarboxylic acid, 2,5-naphthalenedicarboxylic acid, 2,6-naphthalenedicarboxylic acid, 2,2'-biphenyldicarboxylic acid, 3,3'-biphenyldicarboxylic acid, 4,4'-biphenyldicarboxylic acid, 4,4'-diphenyl ether dicarboxylic acid, 4,4'-diphenylmethane dicarboxylic acid, 4,4'-diphenyl sulfone dicarboxylic acid, 4,4'-diphenylisopropylidene dicarboxylic acid, 1,2-bis(phenoxy)ethane-4,4'-dicarboxylic acid, 2,5-anthracene dicarboxylic acid, 2,6-anthracene dicarboxylic acid, 4,4'-p-terphenylenedicarboxylic acid and 2,5-pyridinedicarboxylic acid and the like.

Examples of aliphatic diols include ethylene glycol, propyleneglycol, butyleneglycol, hexyleneglycol, neopentyl glycol, 2-methyl-1,3-propanediol, diethylene glycol and triethylene glycol and the like. As alicyclic diols, 1,4-cyclohexanedimethanol and the like are mentioned.

About these aromatic dicarboxylic acids and aliphatic diols or alicyclic diols, the respective above-mentioned compounds can be used alone or two or more types of respective compounds can be used in combination. Further, the polyester resins constituting the resin composition of the present invention can have a structure component derived from a monomer with three or more functional groups such as glycerin, trimethylolpropane, pentaerythritol, trimellitic acid and pyromellitic acid only when the amount is 1 mol % or less based on the whole structure unit.

The crystalline terephthalate-based polyester resin is a resin obtained using terephthalic acid as a main component of the aromatic dicarboxylic acid component. Herein, the main component refers that 80 mol % or more of the aromatic dicarboxylic acid component is terephthalic acid, and preferably 90 mol % or more, more preferably 95 mol % or more, and most preferably 100 mol % is terephthalic acid.

In this specification, the "crystalline" polyester resin refers to a resin that, among polyester resins, has no stepwise endothermic change in measurement of differential scanning calorie (DSC) but has a clear endothermic peak. The clear endothermic peak specifically means a peak that has 15° C. or less half-width of the endothermic peak when measured at 10° C./min of the temperature elevation rate in measurement of differential scanning calorie (DSC) described in the method of measuring the glass transition temperature (Tg) of the polyester resin of Examples.

The crystalline terephthalate-based polyester resins are not particularly limited, as long as they are as defined above. About a resin with a structure in which other components are copolymerized with the main chain of a terephthalate-based polyester, for example, when this resin shows a clear endothermic peak as mentioned above, this corresponds to the crystalline terephthalate-based polyester resin in the present invention.

As the component of the aliphatic diol in the crystalline terephthalate-based polyester resin, those exemplified above may be used. At least one kind of ethylene glycol, propylene glycol, and butylene glycol is preferably used.

Specific examples of the crystalline terephthalate-based polyester resin include polyethylene terephthalate, polypropylene terephthalate, polybutylene terephthalate and the like. The terephthalate-based polyester is preferably at least one kind of polyethylene terephthalate and polybutylene terephthalate because they are widely used, and easily recycled to a resin having high fluidity and high impact resistance by the method of the present embodiment.

The crystalline polyester terephthalate-based resins can be used alone or two or more crystalline polyester resins can be used in combination.

The intrinsic viscosity of the crystalline polyester resin is not particularly limited and is in the range of preferably from 0.4 to 1.5 dl/g, more preferably from 0.7 to 1.5 dl/g in view of impact resistance and fluidity. The intrinsic viscosity in this specification is a value measured using a phenol/tetrachloroethane (weight ratio: 1/1) mixed solvent at 30° C. according to JIS K7367-5 (2000).

As the terephthalate-based polyester, resin pieces obtained by pulverizing disposed polyester resin products can be used. In particular, as PET with an intrinsic viscosity within the above-mentioned range, the pulverized products of PET products such as used PET bottles which are disposed can be also suitably used. Bottles, sheets and clothes which are PET products retrieved as waste, and molding waste and fiber waste and the like generated when these molded articles are molded are pulverized into a proper size, and the obtained resin pieces can be used. Among these, the pulverized products of drinking bottles, which are quantitatively large, can be suitably used. In general, PET bottles are recycled into transparent clear flakes with a size of 5 to 10 mm by undergoing separate collection and then the steps of removing different materials, pulverizing and washing. Generally, the instinct viscosity of such clear flakes is approximately in the range of 0.60 to 0.80 dl/g.

The polyester resin pieces of disposed polyester resin products can be also obtained by pulverizing, washing and drying, and then temporary kneading at a temperature of 180° C. or more and 260° C. or less, and cooling and pulverizing. Virgin (unused) polyester resins are put on the market in the form of pellet, and these are pressed at a temperature equal to or higher than the glass transition temperature, or temporarily melted with an extruder or the like, and a molten strand is squeezed by passing through a roller in a coolant and is, for example, cut with a general pelletizer, and thus the resins can be used as resin pieces.

By using resin pieces of polyester resins, the supply to a kneading device is facilitated in the production of a resin composition, and the load to the kneading device during kneading until melting is reduced. As the form of polyester resin pieces, preferred are, for example, the flake form, the block form, the powder form, the pellet form and the like, and particularly preferred is the pellet form. The maximum length of resin pieces is preferably 30 mm or less, more preferably 20 mm or less, and further preferably 10 mm or less. Even when resin pieces with a maximum length of above 30 mm are contained, kneading can be performed, but clogging can occur in the supply process, which is not preferred. However, the clogging can be prevented by improving a supply device, and thus the length of resin pieces is not particularly limited as long as the object of the present invention is impaired.

The polyester resin A is a polyester obtained using at least one kind of isophthalic acid, orthophthalic acid, naphthalenedicarboxylic acid, anthracene dicarboxylic acid and pyridine dicarboxylic acid as an aromatic dicarboxylic acid component. The above-mentioned compounds constituting the aromatic dicarboxylic acid component of the polyester resin A has similar structure to that of terephthalic acid used as the aromatic dicarboxylic acid component of the terephthalate-based polyester, and has easy occurrence of the transesterification, and thus can effectively suppress crystallinity of the terephthalate-based polyester. The polyester resin A can be used alone or two or more crystalline polyester resins can be used in combination.

In the polyester resin A, preferably used as a main component of the aromatic dicarboxylic acid component are isophthalic acid, orthophthalic acid, naphthalenedicarboxylic acid, anthracene dicarboxylic acid and pyridine dicarboxylic acid. Herein, the main component refers that 80 mol % or more of the aromatic dicarboxylic acid component is the above-mentioned aromatic dicarboxylic acid, and preferably 90 mol % or more, more preferably 95 mol % or more and most preferably 100 mol % is the above-mentioned aromatic dicarboxylic acid.

The polyester resin A is preferably a naphthalate-based polyester resin using naphthalenedicarboxylic acid, suitably 2,6-naphthalenedicarboxylic acid as a main component of the aromatic dicarboxylic acid component because the transesterification is effectively performed, and improvements of the toughness and the fluidity are further easily achieved. Herein, the main component refers that 80 mol % or more of the aromatic dicarboxylic acid component is naphthalenedicarboxylic acid, and preferably 90 mol % or more, more preferably 95 mol % or more and most preferably 100 mol % is naphthalenedicarboxylic acid.

The polyester resin A is not particularly limited, but preferably has crystallinity. Herein, the crystallinity is as defined for the above-mentioned terephthalate-based polyester resin.

As the component of the aliphatic diol in the polyester resin A, those exemplified above may be used. At least one kind of ethylene glycol, propylene glycol, and butylene glycol is preferably used.

Examples of the polyester resin A include polyethylene naphthalate, polybutylene naphthalate and the like.

The intrinsic viscosity of the polyester resin A is not particularly limited, but is in the range of preferably 0.4 to 1.5 dl/g, more preferably 0.5 to 1.3 dl/g and further preferably 0.6 to 0.9 dl/g in consideration of the impact resistance and the fluidity.

In the present invention, it is preferred that the crystalline terephthalate-based polyester resin is at least one kind of polyethylene terephthalate and polybutylene terephthalate, and the polyester resin A is at least one kind of polyethylene naphthalate and polybutylene naphthalate. Those are preferred because these resins are similar to each other in the structure, and have close SP values (solubility parameter) to each other, and thus the compatibility is high, and the transesterification occurs easily.

(Metal-Based Catalyst)

It is preferred that in the step (1), a metal-based catalyst be added in an amount of 0.05 weight % or less with respect to a total of 100 weight % of the crystalline terephthalate-based polyester and the polyester resin A. By adding a metal catalyst, the transesterification reaction of a terephthalate-based polyester and a polyester resin A is promoted and the reaction proportion is then increased, which is preferred. In addition, when the amount of metal-based catalyst added is 0.05 weight % or less with respect to a total of 100 weight % of the resins, the decomposition of the resins is difficult to occur, which is preferred. More preferably, the amount of metal-based catalyst added when a metal-based catalyst is added, is from 0.001 to 0.05 weight % with respect to 100 weight % of polyester resins (the sum of the terephthalate-based polyester/the polyester resin A).

The above-mentioned metal-based catalyst is not particularly limited and is preferably a catalyst containing a metal selected from the group consisting of La, Ti and Zn. Specifically, the catalysts include lanthanum (III) acetylacetonate hydrate (the formula (I) given below), zinc acetate (the formula (2) given below), titanium(IV)oxydiacetylacetonate (the formula (3) given below) and the like.

[Chem. 1]

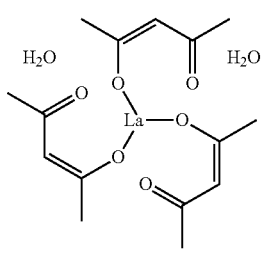

(1)

[Chem. 2]

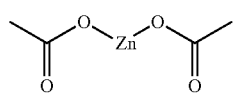

(2)

[Chem. 3]

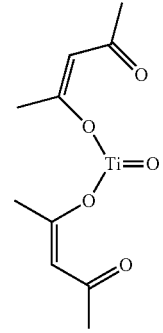

(3)

The timing for adding the metal-based catalyst is preferably before the melt-mixing in order to effectively progress the transesterification, and is not particularly limited if it is before the melt-mixing. The terephthalate-based polyester, the polyester resin A, and the metal-based catalyst may be added in a batch, and then melt-mixed; the metal-based catalyst may be added to either one of the terephthalate-based polyester/the polyester resin A, and then the other polyester resin may be added and melt-mixed; or the terephthalate-based polyester and the polyester resin A may be preliminarily mixed, and then the metal-based catalyst may be added and melt-mixed.

<Step (2)>

In the step (2), the polyester resin mixture obtained in the step (1) (hereinafter, also simply referred to as the polyester resin mixture), a polycarbonate resin, a flame retardant and a toughening agent are mixed. The mixing is preferably melt-kneading.

In the step (2), the polyester resin mixture obtained in the step (1) (hereinafter, also referred to as "polyester resin mixture"), a polycarbonate resin, a flame retardant, and a toughening agent are mixed. The mixing is preferably melt-kneading.

The preliminary mixing treatment in which components to be mixed are preliminarily mixed can be performed before the melt-kneading treatment. As a mixer used for preliminary mixing, mixers such as a V type mixer, a ribbon mixer, a Nauta mixer and a Super mixer are mentioned.

The melt-kneading can be performed using a Banbury mixer, a roller and a uniaxial or multiaxial extruder and the like, and is preferably performed by a biaxial extruder. The melt-kneading conditions are not particularly limited, and, for example, the cylinder temperature during melt-kneading is preferably in the range of 240 to 300° C., and more preferably the range of 250 to 280° C. The kneading pressure is not particularly limited, and is preferably from 1 to 20 MPa.

The discharge amount from an extruder during melt-kneading is not particularly limited, and is preferably from 10 to 100 kg/h and more preferably from 20 to 70 kg/h because melt-kneading is sufficiently performed.

The kneading weight ratio of the polycarbonate resin and the polyester resin mixture is not particularly limited. The ratio of polycarbonate resin:polyester resin mixture (weight ratio) is preferably 10:90 to 98:2, more preferably 10:90 to 90:10, and further preferably 30:70 to 90:10 in terms of the impact resistance and the fluidity.

The kneading weight ratio of the flame retardant is not particularly limited, but the flame retardant is preferably in an amount of 1 to 40 parts by weight, and more preferably 10 to 40 parts by weight with respect to a total of 100 parts by weight of the polyester resin mixture and the polycarbonate resin from the viewpoint of improvement of the flame resistance.

The kneading weight ratio of the toughening agent is not particularly limited. The toughening agent is preferably in an amount of 1 to 20 parts by weight, and more preferably 5 to 20 parts by weight with respect to a total of 100 parts by weight of the polyester resin mixture and the polycarbonate resin from the viewpoint of improvement of the toughness.

The resin kneaded mixture in the molten state obtained by melt-kneading as mentioned above is preferably subjected to cooling treatment after injected. The cooling treatment is not particularly limited, and, for example, a water cooling method in which the above-mentioned resin kneaded mixture is immersed in 0 to 60° C. water, a cooling method using −40 to 60° C. gas, and a method in which the kneaded mixture is brought into contact with −40 to 60° C. metal, and the like can be used.

The resin composition thus obtained is preferably cut by, for example, a pelletizer to obtain pellets in order to facilitate treatment during injection molding by an injection molding method.

(Polycarbonate Resin)

The polycarbonate resin can be an aromatic homo- or copolycarbonate resin obtained by the reaction of an aromatic divalent phenol compound and phosgene or a carbonate diester. The method for producing such polycarbonate resin is not particularly limited, and well-known methods can be adopted, and examples thereof include a method in which an aromatic divalent phenol compound is directly reacted with phosgene and the like (an interfacial polymerization method), a method in which an aromatic divalent phenol compound and a carbonate diester such as diphenyl carbonate are transesterified in the molten state (a solution method), and the like.

The weight average molecular weight of the polycarbonate resin is preferably 20,000 to 70,000. With the weight average molecular weight of the polycarbonate resin being 20,000 or more, the impact resistance further improves, and with the weight average molecular weight of the polycarbonate resin being 70,000 or less, the fluidity becomes high, and thus the range is preferred. The weight average molecular weight of the polycarbonate resin is more preferably 30,000 to 55,000. The weight average molecular weight is measured by the measurement methods described in Examples below. Because the crystallinity of the terephthalate-based polyester is suppressed according to the production method of the present embodiment, the impact resistance is secured even if a polycarbonate resin of relatively low molecular weight (for example, 20,000 to 45,000 or so of the weight average molecular weight) is used, wherein the impact resistance has decreased with such low molecular weight in a conventional combination system of a terephthalate-based polyester and a polycarbonate resin. In addition, because the crystallinity of the terephthalate-based polyester is suppressed according to the production method of the present embodiment, high fluidity is secured even if a polycarbonate resin of relatively high molecular weight (for example, 40,000 to 70,000 or so of the weight average molecular weight) is used, wherein the fluidity has decreased with such high molecular weight in a conventional combination system of a terephthalate-based polyester and a polycarbonate resin.

Examples of aromatic divalent phenol compounds include 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 1,1-bis(4-hydroxyphenyl)cyclohexane, and 1-phenyl-1,1-bis(4-hydroxyphenyl)ethane and the like, and these can be used alone or as a mixture.

As the carbonate diesters, for example, diaryl carbonates such as diphenyl carbonate, ditolyl carbonate and bis(chlorophenyl)carbonate, dialkyl carbonates such as dimethyl carbonate and diethyl carbonate, carbonyl halides such as phosgene, haloformates such as dihaloformates of a divalent phenol, and the like can be used, but not limited thereto. Among these, preferred is diphenyl carbonate. In addition, these carbonate diesters can be used alone or two or more carbonate diesters can be used in combination.

The polycarbonate resin can be, for example, a branched polycarbonate resin in which a multifunctional aromatic compound having three or more functional groups, such as 1,1,1-tris(4-hydroxyphenyl)ethane or 1,1,1-tris(3,5-dimethyl-4-hydroxyphenyl)ethane, is copolymerized, or a polyester carbonate resin in which an aromatic or aliphatic bifunctional carboxylic acid is copolymerized. In addition, the polycarbonate resin can be a mixture obtained by mixing two or more types of the obtained polycarbonate resins.

As the polycarbonate resin, a commercial product may be used.

As the polycarbonate resins, resin pieces obtained by pulverizing disposed polycarbonate resin products can be used. In particular, as polycarbonate within the above-mentioned range of molecular weight, the pulverized products of disposed optical disks and the like can be also suitably used. Optical disks such as CD, CD-R, DVD and MD, and mill ends generated during the molding process of optical lens, and a resin obtained by exfoliating a reflection layer, recording layer and the like from an optical disk, which becomes waste, and the like are pulverized into a proper size with 10 mm or less, and the obtained resin pieces are not particularly limited and can be used in the present invention. The polycarbonate resin pieces of disposed polycarbonate resin products can be obtained by pulverizing and washing and temporary kneading at a temperature of 180° C. or more and 260° C. or less, and cooling and pulverizing.

Virgin (unused) polycarbonate resins are put on the market in the form of pellet, and these are pressed at a temperature equal to or higher than the glass transition temperature, or temporarily melted with an extruder or the like, and a molten strand is squeezed by passing through a roller in a coolant and is, for example, cut with a general pelletizer, and thus the resins can be used as resin pieces.

By using resin pieces of polycarbonate resins, the supply to a kneading device is facilitated in the production of a resin composition, and the load to the kneading device during kneading until melting is reduced. As the form of polycarbonate resin pieces, preferred are, for example, the flake form, the block form, the powder form, the pellet form and the like, and particularly preferred is the flake form. The maximum length of resin pieces is preferably 30 mm or less, more preferably 20 mm or less, and further preferably 10 mm or less. Even when resin pieces with a maximum length of above 30 mm are contained, kneading can be performed, but clogging can occur in the supply process, which is not preferred. However, the clogging can be prevented by improving a supply device, and thus the length of resin pieces is not particularly limited as long as the object of the present invention is not impaired.

(Flame Retardant)

The flame retardant can be an organic flame retardant or an inorganic flame retardant. Examples of organic flame retardants include bromine compounds and phosphorus compounds. Examples of inorganic flame retardants include antimony compounds and metal hydroxides.

At least a part of the flame retardant is preferably a phosphorus compound. This is because phosphorus compounds easily impart high flame resistance to a resin composition and do not have environmental toxicity. The phosphorus compounds are typically phosphate ester compounds; examples of phosphate ester compounds include phosphite esters, phosphate esters and esterified compounds of phosphonic acid, and the like. Particularly preferred are phosphate esters.

Specific examples of phosphite esters include triphenyl phosphite, tris(nonylphenyl)phosphite, tris(2,4-di-t-butylphenyl)phosphite, distearyl pentaerythritol diphosphite, bis(2,6-di-t-butyl-4-methylphenyl)pentaerythritol diphosphite, bis(2,4-di-t-butylphenyl)pentaerythritol diphosphite and the like.

Specific examples of phosphate esters include triphenyl phosphate, tris(nonylphenyl)phosphate, tris(2,4-di-t-butylphenyl)phosphate, distearyl pentaerythritol diphosphate, bis(2,6-di-t-butyl-4-methylphenyl)pentaerythritol diphosphate, bis(2,4-di-t-butylphenyl)pentaerythritol diphosphate, tributyl phosphate, bisphenol A bis-diphenyl phosphate, aromatic condensed phosphate esters and the like. Examples of condensed phosphate esters include 1,3-phenylene bis(di-2,6-xylenyl phosphate), bisphenol A bis(diphenyl phosphate) and 1,3-phenylenebis(diphenylphosphate) and the like.

Specific examples of phosphonate esters include dimethyl benzenephosphonate, benzenephosphonate esters and the like.

Examples of bromine compounds include polybrominated diphenyl ethers, tetrabromobisphenol A, brominated epoxy oligomers and brominated polycarbonate oligomers.

Commercially available products can be used as a flame retardant, and examples of commercially available phosphorus compounds include "CR-7335", "CR-741" (both are condensed phosphate esters, liquid), "PX-200" (a condensed phosphate ester, solid) manufactured by DAIHACHI Chemical Industry Co., Ltd., "SPS-100" (a phosphazene compound, solid) manufactured by Otsuka Chemical Co., Ltd., and the like.

The flame retardants can be used alone or two or more flame retardants can be used in combination.

(Toughening Agent)

The toughening agent improves the flexibility, processability, impact resistance and the like of a resin composition. The toughening agents can be used alone or two or more toughening agents can be used. The toughening agent is, for example, a resin having rubber elasticity. The toughening agent is preferably a thermoplastic elastomer including a soft segment constituted of a polymer of a monomer including butadiene, and a hard segment constituted of a polymer of a monomer having an aromatic group such as styrene. About the molecular size of the above-mentioned thermoplastic elastomer, when the molecular size is too small, for example, the impact resistance of a resin composition can decrease, and when the size is too large, the processability of a thermoplastic resin composition can decrease. From such viewpoints, for example, the weight average molecular weight of the thermoplastic elastomer is preferably 10,000 to 500,000. The weight average molecular weight of the thermoplastic elastomer can be also obtained using a well-known method such as gel permeation chromatography.

As the structure of the above-mentioned thermoplastic elastomer, for example, a core shell structure, a graft structure, a straight chain structure and a sea island structure (what is called "polymer alloy") are known. The structure of a thermoplastic elastomer can be any of them. The core shell structure includes, for example, the core which is a cross-linked rubber particle, and the shell obtained by graft-polymerization of a vinyl monomer in the presence of the core. The core is mainly constituted of a soft segment, and the shell is mainly constituted of a hard segment. The graft structure is, for example, constituted of the backbone polymer, which is either a soft segment or a hard segment, and branch polymers, which are from another one. The straight chain structure is, for example, constituted of a block copolymer by a soft segment and a hard segment. The sea island structure is, for example, constituted of islands (dispersed phase) mainly constituted of a soft segment and the sea (continuous phase) mainly constituted of a hard segment.

Examples of the above-mentioned thermoplastic elastomers include methyl methacrylate-butadiene-styrene copolymer (MBS), acrylonitrile-butadiene-styrene copolymer (ABS), styrene-butadiene-styrene copolymer (SBS), butyl acrylate-methylmethacrylate copolymer, and the like. These thermoplastic elastomers can be used alone or two or more thermoplastic elastomers can be used in combination. Among these, it is preferred that the toughening agent be one or more selected from the group consisting of MBS, ABS and SBS in terms of the compatibility properties and flame resistance of a thermoplastic resin composition, and the dispersibility of a thermoplastic elastomer in a thermoplastic resin composition.

In addition, it is preferred that the structure of MBS be a core shell structure and the amount of rubber in MBS be 50 to 80 weight % in terms of the impact resistance of a thermoplastic resin composition and the dispersibility of MBS in a thermoplastic resin composition, and the like. In addition, it is preferred that the structure of ABS be a graft structure and the amount of rubber in ABS be 10 to 55 weight % in terms of the compatibility properties and processability of a thermoplastic resin composition. In addition, it is preferred that the structure of SBS be a straight chain structure and the amount of rubber in SBS be 50 to 80 weight % in terms of the flexibility and impact resistance of a thermoplastic resin composition. The above-mentioned "amount of rubber" means the soft segment content in the above-mentioned thermoplastic elastomer.

As an example of MBS, EM500 (LG Chemical, Ltd.) is mentioned. As an example of ABS, TFX-610 (Mitsubishi Chemical Corporation) is mentioned. As an example of SBS, cariflex TRKX65S (Shell Chemical Company) is mentioned.

In the step (2), in addition to the above-mentioned components, a drip inhibitor and a compatibilizing agent are preferably added and mixed.

At this time, in the step (2), preferably mixed are 10 to 90 parts by weight of the polyester resin mixture, 10 to 90 parts by weight of the polycarbonate resin (wherein the sum of the polyester resin composition and the polycarbonate resin is 100 parts by weight), 0.5 to 20 parts by weight of the compatibilizing agent, 1 to 40 parts by weight of the flame retardant, 0.1 to 1 part by weight of the drip inhibitor, and 1 to 20 parts by weight of the toughening agent because the balance of the toughness, the fluidity and the flame resistance are excellent.

(Drip Inhibitor)

A drip inhibitor is added for the purpose of inhibiting dripping of resin materials during burning and improving flame resistance, and the drip inhibitors include fluorine drip inhibitors, silicone rubber, layered silicate and the like.

The above-mentioned layered silicate include smectite clay minerals such as montmorillonite, saponite, hectorite, beidellite, stevensite and nontronite, vermiculite, halloysite, swellable mica, talc and the like, and can be those in which an organic cation, a quaternary ammonium cation or a phosphonium cation is intercalated into the interlayers thereof.

Among the above-mentioned drip inhibitors, particularly preferred are fluorine drip inhibitors, and specific examples of fluorine drip inhibitors include, for example, fluorine resin such as polytetrafluoroethylene, polyvinylidene fluoride and polyhexafluoropropylene, perfluoroalkane sulfonic acid alkali metal salt compounds or perfluoroalkane sulfonic acid alkaline earth metal salts such as perfluoromethane sulfonic acid sodium salt, perfluoro-n-butane sulfonic acid potassium salt, perfluoro-t-butane sulfonic acid potassium salt, perfluorooctane sulfonic acid sodium salt and perfluoro-2-ethylhexane sulfonic acid calcium salt, and the like. Among the above-mentioned fluorine drip inhibitors, most preferred is polytetrafluoroethylene in terms of drip inhibiting properties.

The drip inhibitors can be used alone or two or more drip inhibitors can be used in combination.

(Compatibilizing Agent)

The compatibilizing agent is a compound having a double bond, a carboxyl group, an epoxy group, an isocyanate group or the like (a low molecular weight compound or a polymer), and one which functions as a compatibilizing agent by showing a surface active agent-like function based on a graft or block structure by reacting with one or both of polymers to which compatibility properties are imparted in the molding process step (Reference: "polymer alloy" basic and application, edited by The Society of Polymer Science, published in 1993), and includes a resin having a reactive functional group disclosed in Japanese Patent Application Laid-Open No. 2013-133369 and the like. Examples of compatibilizing agents include copolymers having a constituent unit derived from glycidyl methacrylate (GMA) such as an ethylene glycidyl methacrylate copolymer (E-GMA; the weight composition of copolymerization, e.g. E/GMA=100/6 to 12), an ethylene glycidyl methacrylate-vinyl alcohol copolymer (E-GMA-VA; the weight composition of copolymerization, e.g. E/GMA/VA=100/3 to 12/8 to 5), and an ethylene glycidyl methacrylate-methacrylate copolymer (E-GMA-MA; the weight composition of copolymerization, e.g. E/GMA/MA=100/3 to 12/30); resins into which glycidyl methacrylate is introduced, such as ethylene glycidyl methacrylate-acrylonitrile styrene (EGMA-AS; the weight composition of copolymerization, e.g. EGMA/AS=70/30), ethylene glycidyl methacrylate-polystyrene (EGMA-PS; the weight composition of copolymerization, e.g. EGMA/PS=70/30), ethylene glycidylmethacrylate-polymethyl methacrylate (EGMA-PMMA, e.g. EGMA/PMMA=70/30) and styrene-acrylonitrile-glycidyl methacrylate (SAN-GMA, e.g. SAN/GMA=styrene/acrylonitrile/glycidyl methacrylate=70/50/10 to 75/23/2); an ethylene maleic anhydride ethyl acrylate copolymer (E-MAH-EA); acid-modified polyethylene wax; a carboxylated polyethylene graft polymer, a carboxylated polypropylene graft polymer; polyisocyanate containing 5 to 30 weight % of isocyanate group and the like.

Commercially available products can be used as a compatibilizing agent, and specifically include BONDFAST E, BONDFAST 2C (manufactured by Sumitomo Chemical Co., Ltd.); REXPERL RA, REXPERL ET, REXPERL RC (manufactured by Japan Polyolefins Corporation); BONDINE (manufactured by Sumitomo Chemical Co., Ltd.); MODIPER (manufactured by NOF Corporation); Hi-WAX (APEW; manufactured by Mitsui Chemicals, Inc.); VESTANAT T1890 (manufactured by Degussa); ARUFON UG-4000 series (manufactured by TOAGOSEI CO., LTD.) and the like.

These compatibilizing agents can be used alone or two or more compatibilizing agents can be used in combination as needed.

Among these, the compatibilizing agent is preferably a copolymer having a constituent unit derived from glycidyl methacrylate (GMA) or a resin into which glycidyl methacrylate is introduced in terms of easily reacting with a polyester resin.

(Other Resin Components and Arbitrary Components)

In the step (2), other resin components and, as needed, arbitrary addition components can be added within the range in which the object of the present invention is achieved.

By adding, for example, a polyolefin such as polyethylene or polypropylene, and a polyamide such as nylon 6 or nylon 66 and the like as other resin components, the ability as a resin for molding can be improved. The content of other resin components is preferably 0.1 to 20 weight % and more preferably 1 to 10 weight % with respect to a total of 100 weight % of polycarbonate resin and polyester resin.

In addition, examples of other arbitrary components include cross-linking agents (e.g. phenol resin and the like), antioxidants (hindered phenol series, sulfur-containing organic compound series, phosphorus-containing organic compound series and the like), heat stabilizers (phenol series, acrylate series and the like), transesterification inhibitors (a mixture of monostearyl acid phosphate and distearyl acid phosphate and the like) ultraviolet absorbers (benzotriazole series, benzophenone series, salicylate series and the like), light stabilizers (organonickel series, hindered amine series and the like), lubricants (higher fatty acid metal salts, higher fatty acid amides and the like), pigments (carbon black, titanium oxide) and dyes, antistatic agents, foaming agents and the like.

Further, other examples of arbitrary components include fillers such as metallic fiber, aramid fiber, asbestos, potassium titanate whiskers, wollastonite, glass flake, glass beads, talc, mica, clay, calcium carbonate, barium sulfate, titanium oxide and aluminum oxide. Among these, preferred are glass fiber, carbon fiber and metallic fiber, and most preferred is carbon fiber. The type of fibrous filler is not particularly limited as long as it is generally used for strengthening resins, and, for example, can be selected from the long fiber type and the short fiber type chopped strands and milled fiber and the like. In addition, the arbitrary component content is preferably 0.01 to 10 weight % and more preferably 0.1 to 5 weight % with respect to a total of 100 weight % of polycarbonate resin and polyester resin.

(Thermoplastic Resin Composition)

The thermoplastic resin composition obtained in the above-mentioned production method has high flame resistance.

The flame resistance is one of the burning resistance, and indicates the property in which the burning rate is slow but burning continues to some extent. As the evaluation of burning resistance, there are JIS, ASTM and the like, and in general, the UL standard is particularly emphasized. The UL standard is provided by "Underwriters Laboratories Inc.", USA, and is the standard evaluated by the company. In general, using a test method in which a flame is applied to a test piece provided by UL94 to confirm the burning time and the presence or absence of dripping substances, a fire retardant substance is classified into "UL94-HB", and a self-extinguishing substance is classified into any of "UL94-V2", "UL94-V1", "UL94-V0" and "UL94-5V" depending on its degree. The self-extinguishment means, among properties of flame resistance, the property in which burning continues as long as there is a fire source but fire is self-extinguished by removing the fire source.

About the materials used in various fields such as office equipment, information-telecommunications equipment, electrical and electric equipment, consumer electronics, the automobile field, and the architecture field, their parts used are generally required to have flame resistance provided in UL-94. It is preferred that the flame resistance of a thermoplastic resin composition to be obtained be equal to or higher than UL94-V1, and more preferred that the flame resistance of a thermoplastic resin composition to be obtained be equal to or higher than UL94-V0.

(Resin Molded Body)

The thermoplastic resin composition obtained in the above-mentioned production method can be molded into a resin molded body in any techniques. Examples of molding techniques include injection molding, extrusion molding, blow molding, vacuum molding, profile extrusion molding, compression molding, gas assist molding and the like. As described above, the resin composition of the present invention has high fluidity and is suitable for injection molding, and thus is preferably a resin composition for injection molding.

The resin molded bodies of a thermoplastic resin composition obtained in the above-mentioned production method can be used for electrical and electric parts, automobile parts, machine mechanism parts, housing parts of office automation equipment or home appliances and the like, and, in particular, are preferably used for cases for office automation equipment such as a printer.

DESCRIPTION OF THE PREFERRED EMBODIMENT(S)

The effects of the present invention will be described using the following examples and comparative examples. It is noted, however, that the technical scope of the present invention is not limited to only the following examples.

<Measurement Method>

(Measurement of Weight Average Molecular Weight (Mw))

A sample was measured in the range of 4 to 7 g, and added to THF. Ultrasonic waves were then applied thereto for 30 minutes and a molten part was used for measurement by a GPC device. For the weight average molecular weight (Mw) (in terms of polystyrene equivalents), HLC-8120GPC and SC-8020 devices manufactured by TOSOH CORPORATION were used as GPC devices, TSK gel Super HM-H (6.0 mm ID×15 cm×2) was used as a column, and tetrahydrofuran (THF) for chromatography manufactured by Wako Pure Chemical Industries, Ltd. was used as an eluent. The experiment was performed under the experimental conditions of a flow rate of 0.6 ml/min., a sample injection rate of 10 l and a measurement temperature of 40° C., using an RI detector. In addition, a calibration curve was created using 10 samples of "polystyrene standard samples, TSK standard": A-500, F-1, F-10, F-80, F-380, A-2500, F-4, F-40, F-128 and F-700 manufactured by TOSOH CORPORATION. In addition, the interval of data collection in the sample analysis was 300 ms.

(Glass Transition Temperature (Tg) of Polyester Resin)

The glass transition temperature (Tg) of endothermic peak temperature of a polyester resin were obtained using a differential scanning calorimeter (manufactured by Shimadzu Corporation: DSC-60A) according to ASTM D3418. For the temperature correction in the detecting part in this device (DSC-60A), the melting points of indium and zinc were used, and for the correction of heat amount, the heat of melting of indium was used. An aluminum pan was used for a sample and an empty pan was set for control. The temperature was increased at a temperature increasing rate of 10° C./min, and hold at 200° C. for 5 minutes, and decreased from 200° C. to 0° C. using liquid nitrogen at −10° C./min, and hold at 0° C. for 5 minutes. The temperature was increased at 10° C./min from 0° C. to 200° C. again. An analysis was made from the endothermic curve of the second temperature increase.

Example 1

(1) Step (1)

80 Parts by weight of a polyethylene terephthalate resin (intrinsic viscosity [η]=0.780 dl/g, trade name Diagram night MA521H-D25 manufactured by Mitsubishi Rayon Co., Ltd.) and 20 parts by weight of a polyethylene naphthalate resin (intrinsic viscosity [η]=0.71 dl/g, trade name Teonex TN8065S manufactured by Teijin Chemicals Ltd.) were dry-blended using a V type mixer, and dried for 4 hours at 80° C. under reduced pressure using a vacuum dryer.

The dried mixture was charged into the raw material feed opening of a biaxial kneading extruder and melt-kneaded under conditions of a cylinder temperature of 260° C. and a discharge amount of 30 kg/h. The kneaded mixture discharged from the biaxial kneading extruder was rapidly cooled by immersion into 30° C. water, and was pulverized into the pellet form with a pelletizer to obtain a polyester resin mixture. The obtained polyester resin mixture was dried using a vacuum dryer at 80° C. for 4 hours under reduced pressure.

(2) Step (2)

15 Parts by weight of the polyester resin mixture obtained in the step (1), 55 parts by weight of a polycarbonate resin (weight average molecular weight of 50,000, trade name TARFLON A-1900 manufactured by IDEMITSU KOSAN CO., LTD.), 15 parts by weight of a flame retardant (condensed phosphoric acid-based compound; trade name PX-200 manufactured by DAIHACHI CHEMICAL INDUSTRY CO., LTD.), 0.5 part by weight of a drip inhibitor (PTFE; trade name FA-500H manufactured by DAIKIN INDUSTRIES, Ltd.), 8 parts by weight of a toughening agent (1:1 (weight ratio) mixture of MBS; trade name EM500 manufactured by LG Chem Ltd. and ABS; trade name TFX-610 manufactured by Mitsubishi Chemical Corporation) and 0.5 part by weight of a compatibilizing agent (styrene-acrylonitrile-glycidyl methacrylate, trade name: arufon UG4035 manufactured by TOAGOSEI CO., LTD.) were dry-blended using a V type mixer.

The mixture was charged into the raw material feed opening of a biaxial kneading extruder and melt-kneaded under the conditions of a discharge amount of 30 kg/h at 250° C. at a kneading pressure of 1.0 MPa. The kneaded mixture discharged from the biaxial kneading extruder was rapidly cooled by immersion into 30° C. water, and was pulverized into the pellet form with a pelletizer to obtain a thermoplastic resin composition.

Example 2

A thermoplastic resin composition was obtained in the same manner as in Example 1 except that the cylinder temperature in the step (1) was changed to 240° C.

Example 3

A thermoplastic resin composition was obtained in the same manner as in Example 1 except that the cylinder temperature in the step (1) was changed to 250° C.

Example 4

A thermoplastic resin composition was obtained in the same manner as in Example 1 except that the cylinder temperature in the step (1) was changed to 280° C.

Example 5

A thermoplastic resin composition was obtained in the same manner as in Example 1 except that the cylinder temperature in the step (1) was changed to 290° C.

Example 6

A thermoplastic resin composition was obtained in the same manner as in Example 1 except that the step (1) was changed as described below.
(1) Step (1)
80 Parts by weight of a polyethylene terephthalate resin (intrinsic viscosity [η]=0.780 dl/g, trade name Diagram night MA521H-D25 manufactured by Mitsubishi Rayon Co., Ltd.) and 20 parts by weight of a polyethylene naphthalate resin (intrinsic viscosity [η]=0.71 dl/g, trade name Teonex TN8065S manufactured by Teijin Chemicals Ltd.) were dry-blended using a V type mixer, and dried for 4 hours at 80° C. under reduced pressure using a vacuum dryer.

0.05 Parts by weight of lanthanum (III) acetyl acetonate hydrate, which is a metal-based catalyst, was blended with respect to the dried mixture using a V type mixer to obtain pellets. The obtained pellets were charged into the raw material feed opening of a biaxial kneading extruder and melt-kneaded under conditions of a cylinder temperature of 260° C. and a discharge amount of 30 kg/h. The kneaded mixture discharged from the biaxial kneading extruder was rapidly cooled by immersion into 30° C. water, and was pulverized into the pellet form with a pelletizer to obtain a polyester resin mixture. The obtained polyester resin mixture was dried for 4 hours at 80° C. under reduced pressure using a vacuum dryer.

Example 7

A thermoplastic resin composition was obtained in the same manner as in Example 1 except that in the step (1), 50 parts by weight of the polyethylene terephthalate resin and 50 parts by weight of the polyethylene naphthalate resin were used.

Example 8

A thermoplastic resin composition was obtained in the same manner as in Example 1 except that in the step (1), 70 parts by weight of the polyethylene terephthalate resin and 30 parts by weight of the polyethylene naphthalate resin were used.

Example 9

A thermoplastic resin composition was obtained in the same manner as in Example 8 except that the cylinder temperature in the step (1) was changed to 270° C.

Example 10

A thermoplastic resin composition was obtained in the same manner as in Example 1 except that the naphthalate-based polyester was changed to a polybutylene naphthalate resin (intrinsic viscosity [η]=0.5 to 1.5 dl/g, trade name PBN resin manufactured by Teijin Chemicals Ltd.) from the polyethylene naphthalate resin.

Example 11

A thermoplastic resin composition was obtained in the same manner as in Example 1 except that the terephthalate-based polyester was changed to a polybutylene terephthalate resin (intrinsic viscosity 1.41 dl/g, trade name Torecon 1100M manufactured by Toray Industries, Inc.) from the polyethylene terephthalate resin.

Example 12

A thermoplastic resin composition was obtained in the same manner as in Example 1 except that the terephthalate-based polyester was changed to the polybutylene terephthalate resin as in Example 11 from the polyethylene terephthalate resin, and the naphthalate-based polyester was changed to the polybutylene naphthalate resin as in Example 10 from the polyethylene naphthalate resin.

Example 13

A thermoplastic resin composition was obtained in the same manner as in Example 6 except that the terephthalate-based polyester was changed to a polybutylene terephthalate resin as in Example 11 from the polyethylene terephthalate resin, and the naphthalate-based polyester was changed to a polybutylene naphthalate resin as in Example 10 from the polyethylene naphthalate resin.

Example 14

A thermoplastic resin composition was obtained in the same manner as in Example 1 except that in the step (2), a polycarbonate resin having a weight average molecular weight of 20,000, trade name novarex 7020R manufactured by IDEMITSU KOSAN CO., LTD. was used.

Example 15

A thermoplastic resin composition was obtained in the same manner as in Example 1 except that in the step (2), a polycarbonate resin having a weight average molecular weight of 70,000, trade name novarex 7027U manufactured by IDEMITSU KOSAN CO., LTD. was used.

Comparative Example 1

(1) Step (1)
80 Parts by weight of a polyethylene terephthalate resin (trade name Diagram night MA521H-D25 manufactured by Mitsubishi Rayon Co., Ltd.) and 20 parts by weight of a polyethylene naphthalate resin (intrinsic viscosity [η]=0.71 dl/g, trade name Teonex TN8065S manufactured by Teijin Chemicals Ltd.) were dry-blended using a V type mixer, and dried for 4 hours at 80° C. under reduced pressure using a vacuum dryer.

(2) Step (2)

15 Parts by weight of the polyester resin mixture, 59.5 parts by weight of a polycarbonate resin (the weight average molecular weight of 50,000, trade name TARFLON A-1900 manufactured by IDEMITSU KOSAN CO., LTD.), 15 parts by weight of a flame retardant (condensed phosphoric acid-based compound; trade name PX-200 manufactured by DAIHACHI CHEMICAL INDUSTRY CO., LTD.), 0.5 part by weight of a drip inhibitor (PTFE; trade name FA-500H manufactured by DAIKIN INDUSTRIES, Ltd.), 10 parts by weight of a toughening agent (1:1 (weight ratio) mixture of MBS; trade name EM500 manufactured by LG Chem Ltd. and ABS; trade name TFX-610 manufactured by Mitsubishi Chemical Corporation) were dry-blended using a V type mixer.

The mixture was charged into the raw material feed opening of a biaxial kneading extruder, and melt-kneaded under the conditions of a discharge amount of 30 kg/h. The kneaded mixture discharged from the biaxial kneading extruder was rapidly cooled by immersion into 30° C. water, and was pulverized into the pellet form with a pelletizer to obtain a thermoplastic resin composition.

Comparative Example 2

A thermoplastic resin composition was obtained in the same manner as in Example 1 except that a polyethylene terephthalate resin (trade name Diagram night MA521H-D25 manufactured by Mitsubishi Rayon Co., Ltd.) only was used instead of the polyester resin mixture in the step 2 without performing the step 1.

The following evaluation was made about a thermoplastic resin composition obtained in each example and comparative example.

<Evaluation Method>

(1) Impact Resistance

A resin composition was dried at 80° C. for 4 hours, and a rectangular test piece with 100 mm×10 mm×4 mm was then molded at a cylinder preset temperature of 260° C. and a die temperature of 40° C. using an injection molding machine "J55ELII" (manufactured by The Japan Steel Works, LTD.). The Izod impact strength test was performed according to "JIS-K7110-1998" and the evaluation was made using the following evaluation standards:

⊙: 42 kJ/m² or more;
○: 32 kJ/m² or more and below 42 kJ/m²;
Δ: 6 kJ/m² or more and below 32 kJ/m² (practical); and
x: below 6 kJ/m² (practically problematic).

(2) Fluidity

A resin composition was dried at 80° C. for 4 hours, and the flow length was then evaluated using an Archimedean spiral flow test piece (path thickness 2 mm, path width 10 mm) using an injection molding machine "ROBOSHOT_S-2000i 50BP" (manufactured by FANUC CORPORATION) according to the company's own evaluation standards mentioned below. The conditions were an injection rate of 60 mm/s, a cylinder temperature of 250° C., a die temperature of 50° C., and an injection pressure of 860 MPa. A longer flow length has better fluidity:

⊙: 350 mm or more;
○: 280 mm or more and below 350 mm;
Δ: 210 mm or more and below 280 mm (practical); and
x: below 210 mm (practically problematic).

(3) Flame Resistance

A resin composition was dried at 80° C. for 4 hours, and a rectangular test piece with 100 mm×10 mm×1.6 mm was then molded using an injection molding machine (manufactured by The Japan Steel Works, LTD., J55ELII) at a cylinder preset temperature of 260° C. and a die temperature of 40° C.

The humidity of the test piece for the UL test obtained in the above-mentioned method was controlled in a thermostatic chamber at a temperature of 23° C. at a humidity of 50% for 48 hours, and the test was performed according to the UL94 test (burning test of plastic materials for parts in devices) provided by UNDERWRITERS LABORATORIES INC. (UL), USA. The UL94V is a method in which flame resistance is evaluated from after flame time and dripping properties after applying a burner flame to a test piece with a prescribed size held vertically for 10 seconds. Each test piece was evaluated according to the following evaluation standards:

○: V0;
Δ: V1; and
x: V2 or HB.

The production conditions of each example and comparative example are shown in Table 1 and the evaluation results are shown in Table 2.

TABLE 1

| | | | Step (1) | | | |
|---|---|---|---|---|---|---|
| | Terephthalate-based polyester | Polyester resin A | Cylinder temperature [° C.] | Catalyst | Ratio of numbers of parts by weight [—] | $\Delta H_A / \Delta H_B$ |
| Example 1 | PET | PEN | 260 | — | 8/2 | 0.6 |
| Example 2 | PET | PEN | 240 | — | 8/2 | 0.7 |
| Example 3 | PET | PEN | 250 | — | 8/2 | 0.7 |
| Example 4 | PET | PEN | 280 | — | 8/2 | 0.4 |
| Example 5 | PET | PEN | 290 | — | 8/2 | 0.4 |
| Example 6 | PET | PEN | 260 | Present | 8/2 | 0.5 |
| Example 7 | PET | PEN | 260 | — | 5/5 | 0.4 |
| Example 8 | PET | PEN | 260 | — | 7/3 | 0.5 |
| Example 9 | PET | PEN | 270 | — | 7/3 | 0.4 |
| Example 10 | PET | PBN | 260 | — | 8/2 | 0.6 |
| Example 11 | PBT | PEN | 260 | — | 8/2 | 0.6 |
| Example 12 | PBT | PBN | 260 | — | 8/2 | 0.6 |
| Example 13 | PBT | PBN | 260 | Present | 8/2 | 0.5 |
| Example 14 | PET | PEN | 260 | — | 8/2 | 0.6 |
| Example 15 | PET | PEN | 260 | — | 8/2 | 0.6 |
| Comparative Example 1 | PET | PEN | Dry-blended | — | 8/2 | — |

TABLE 1-continued

| | PC (parts by weight) | Compatibilizing agent (parts by weight) | Flame retardant (parts by weight) | Drip inhibitor (parts by weight) | Toughening agent (parts by weight) | Step (1) product (parts by weight) | PC molecular weight (Mw) |
|---|---|---|---|---|---|---|---|
| Comparative Example 2 | — | — | — | — | — | — | — |

Step (2)

| | PC (parts by weight) | Compatibilizing agent (parts by weight) | Flame retardant (parts by weight) | Drip inhibitor (parts by weight) | Toughening agent (parts by weight) | Step (1) product (parts by weight) | PC molecular weight (Mw) |
|---|---|---|---|---|---|---|---|
| Example 1 | 55 | 0.5 | 15 | 0.5 | 8 | 15 | 50000 |
| Example 2 | 55 | 0.5 | 15 | 0.5 | 8 | 15 | 50000 |
| Example 3 | 55 | 0.5 | 15 | 0.5 | 8 | 15 | 50000 |
| Example 4 | 55 | 0.5 | 15 | 0.5 | 8 | 15 | 50000 |
| Example 5 | 55 | 0.5 | 15 | 0.5 | 8 | 15 | 50000 |
| Example 6 | 55 | 0.5 | 15 | 0.5 | 8 | 15 | 50000 |
| Example 7 | 55 | 0.5 | 15 | 0.5 | 8 | 15 | 50000 |
| Example 8 | 55 | 0.5 | 15 | 0.5 | 8 | 15 | 50000 |
| Example 9 | 55 | 0.5 | 15 | 0.5 | 8 | 15 | 50000 |
| Example 10 | 55 | 0.5 | 15 | 0.5 | 8 | 15 | 50000 |
| Example 11 | 55 | 0.5 | 15 | 0.5 | 8 | 15 | 50000 |
| Example 12 | 55 | 0.5 | 15 | 0.5 | 8 | 15 | 50000 |
| Example 13 | 55 | 0.5 | 15 | 0.5 | 8 | 15 | 50000 |
| Example 14 | 55 | 0.5 | 15 | 0.5 | 8 | 15 | 20000 |
| Example 15 | 55 | 0.5 | 15 | 0.5 | 8 | 15 | 70000 |
| Comparative Example 1 | 55 | 0.5 | 15 | 0.5 | 8 | 15 | 50000 |
| Comparative Example 2 | 55 | 0.5 | 15 | 0.5 | 8 | 15 (PET only) | 50000 |

*PET: Polyethylene terephthalate  PEN: Polyethylene naphthalate  PBN: Polybutylene naphthalate

TABLE 2

| | Physical properties | | |
|---|---|---|---|
| | Impact resistant characteristics | Fluidity | Flame resistance |
| Example 1 | ○ | ○ | ○ |
| Example 2 | Δ | Δ | ○ |
| Example 3 | ○ | Δ | ○ |
| Example 4 | ○ | ◎ | ○ |
| Example 5 | Δ | ◎ | ○ |
| Example 6 | ◎ | ◎ | ○ |
| Example 7 | ◎ | ◎ | ○ |
| Example 8 | ◎ | ◎ | ○ |
| Example 9 | ○ | ◎ | ○ |
| Example 10 | ○ | ○ | ○ |
| Example 11 | ○ | ○ | ○ |
| Example 12 | ○ | ○ | ○ |
| Example 13 | ◎ | ◎ | ○ |
| Example 14 | Δ | ◎ | ○ |
| Example 15 | ◎ | Δ | ○ |
| Comparative Example 1 | X | Δ | ○ |
| Comparative Example 2 | X | Δ | ○ |

It was shown that the thermoplastic resin compositions of Examples 1 to 15 of the present invention in which preliminary melt-kneading of crystalline terephthalate-based polyester and naphthalate-based polyester was performed, were evaluated as Δ or better in any item of the impact resistance, the fluidity and the flame resistance, and were good in all items of the physical properties.

On the other hand, in the case of Comparative Example 1 in which melt-kneading of crystalline terephthalate-based polyester and naphthalate-based polyester was not performed in the step (1), or Comparative Example 2 in which terephthalate-based polyester only was added, the toughness decreased remarkably.

The suitable embodiments of the present invention were described as above. It is noted, however, that these are presented for the illustration purpose of the present invention and the scope of the present invention is not limited to only these embodiments. The present invention can be performed in various modes different from the above-mentioned embodiments without departing from the gist of the invention.

The present application is based on Japanese Patent Application No. 2014-104694 filed on May 20, 2014, and its disclosure is incorporated herein by reference in its entirety.

What is claimed is:

1. A method for producing a thermoplastic resin composition, the method comprising:
    a step (1) of obtaining a polyester resin mixture by melt-kneading, with an extruder 70 to 50 parts by weight of a crystalline terephthalate-based polyester resin, and 30 to 50 parts by weight of a polyester resin A, based on the sum of the terephthalate-based polyester resin and the polyester resin A being 100 parts by weight, the polyester resin A including at least one aromatic dicarboxylic acid component selected from the group consisting of isophthalic acid, orthophthalic acid, naphthalenedicarboxylic acid, anthracene dicarboxylic acid and pyridine dicarboxylic acid; and
    a step (2) of mixing the polyester resin mixture, a polycarbonate resin, a flame retardant and a toughening agent to produce the thermoplastic resin composition.

2. The production method according to claim 1, wherein the polyester resin A is a naphthalate-based polyester resin.

3. The production method according to claim 1, wherein a cylinder temperature of the extruder is 250 to 280° C.

4. The production method according to claim 1, wherein the melting calorie ($\Delta H_A$) in the DSC melting curve of the polyester resin mixture is 70% or less with respect to the melting calorie ($\Delta H_B$) in the DSC melting curve of the crystalline terephthalate-based polyester resin ($\Delta H_A/\Delta H_B \leq 0.7$).

5. The production method according to claim 1, wherein the crystalline terephthalate-based polyester resin is at least one of polyethylene terephthalate and polybutylene terephthalate, and the polyester resin A is at least one of polyethylene naphthalate and polybutylene naphthalate.

6. The production method according to claim 1, wherein in the step (1), a metal-based catalyst is added in an amount of 0.05 weight % or less with respect to a total of 100 weight % of the crystalline terephthalate-based polyester resin and the polyester resin A.

7. The production method according to claim 1, wherein, in step (2),
- 10 to 90 parts by weight of the polyester resin mixture, and 10 to 90 parts by weight of the polycarbonate resin are mixed based on the sum of the polyester resin mixture and the polycarbonate resin being 100 parts by weight, and
- 0.5 to 20 parts by weight of a compatibilizing agent, 1 to 40 parts by weight of the flame retardant, 0.1 to 1 part by weight of a drip inhibitor, and 1 to 20 parts by weight of the toughening agent with respect to a total of 100 parts by weight of polyester resin mixture and polycarbonate resin are mixed in the step (2).

8. The production method according to claim 1, wherein the molecular weight (Mw) of the polycarbonate resin is 20,000 to 70,000.

9. The production method according to claim 1, wherein the polyester resin A has crystallinity.

\* \* \* \* \*